United States Patent [19]

Matsuyama

[11] Patent Number: 5,583,286

[45] Date of Patent: Dec. 10, 1996

[54] INTEGRATED SENSOR FOR SCANNING PROBE MICROSCOPE

[75] Inventor: Katsuhiro Matsuyama, Hachioji, Japan

[73] Assignee: Olympus Optical Co., Ltd., Tokyo, Japan

[21] Appl. No.: 514,670

[22] Filed: Aug. 14, 1995

[30] Foreign Application Priority Data

Aug. 24, 1994 [JP] Japan .................................. 6-199336

[51] Int. Cl.⁶ ............................................... G01B 7/34
[52] U.S. Cl. ............................ 73/105; 250/306; 250/307
[58] Field of Search ............................... 73/105, 862.634; 250/306, 307; 324/671

[56] References Cited

U.S. PATENT DOCUMENTS

| | | | |
|---|---|---|---|
| 4,992,659 | 2/1991 | Abraham et al. | 250/307 |
| 5,065,103 | 11/1991 | Slinkman et al. | 250/307 |
| 5,072,116 | 12/1991 | Kawade et al. | 73/105 |
| 5,138,159 | 8/1992 | Takase et al. | 250/307 |
| 5,266,801 | 11/1993 | Elings et al. | 250/307 |
| 5,267,471 | 12/1993 | Abraham et al. | 73/105 |
| 5,294,790 | 3/1994 | Ohta et al. | 250/306 |
| 5,333,495 | 8/1994 | Yamaguchi et al. | 73/105 |
| 5,345,815 | 9/1994 | Albrecht et al. | 73/105 |
| 5,386,720 | 2/1995 | Toda et al. | 73/105 |
| 5,410,910 | 5/1995 | Somlyo et al. | 250/307 |
| 5,441,343 | 8/1995 | Pylkki et al. | 250/307 |
| 5,489,774 | 2/1996 | Akamine et al. | 73/105 |

FOREIGN PATENT DOCUMENTS

| | | |
|---|---|---|
| 4-291310 | 10/1992 | Japan. |
| WO92/12398 | 7/1993 | WIPO. |

OTHER PUBLICATIONS

N. F. van Hulst et al, Near–Field Optical Microscope Using a Silicon–Nitride Probe, App. Phys. Lett. 62, 461–463, Feb. 1, 1993.

M. Tortonese et al, Atomic Force Microscopy Using a Piezoresistive Cantiliver, Mar., 1991.

*Primary Examiner*—Richard Chilcot
*Assistant Examiner*—George M. Dombroske
*Attorney, Agent, or Firm*—Frishauf, Holtz, Goodman, Langer & Chick

[57] ABSTRACT

A piezoresistive layer extends in the middle of a cantilever extending from a support section. The cantilever is made of n type silicon and is covered with a silicon oxide film. Electrodes are connected to the both ends of the piezoresistive layer. A p type silicon region is formed at the free end of the cantilever, and includes a sharply pointed portion to provide a probe. An electrode is connected to a p⁺ type silicon region formed in the p type silicon region, and an electrode is connected to an n⁺ type silicon region formed in a position more than 10 μm apart from the p type silicon region. A rectangular through hole is formed in the cantilever between the piezoresistive layer and the probe.

19 Claims, 7 Drawing Sheets

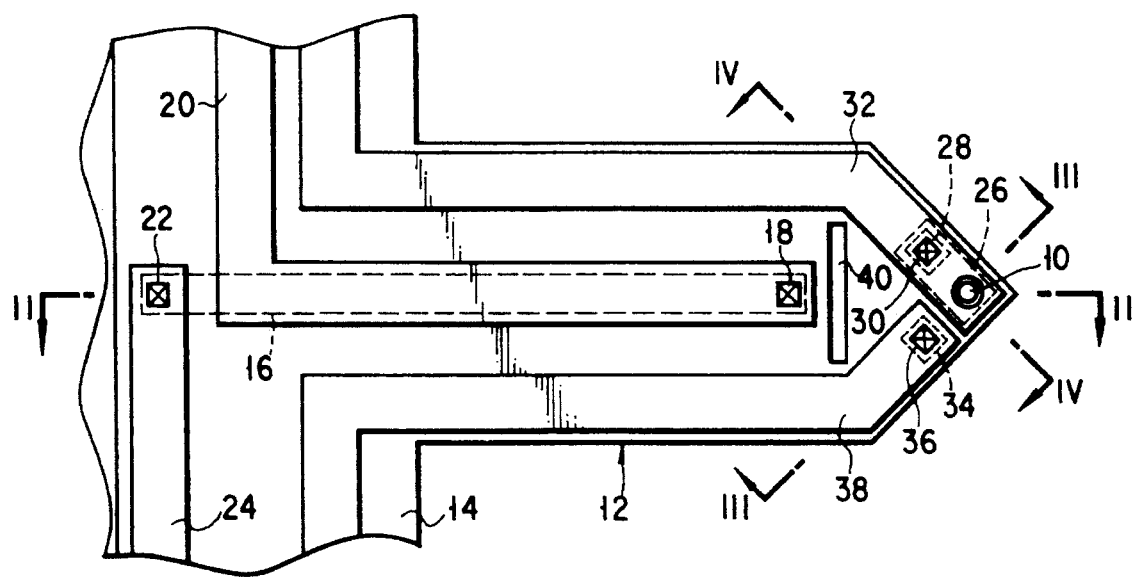
F I G. 1
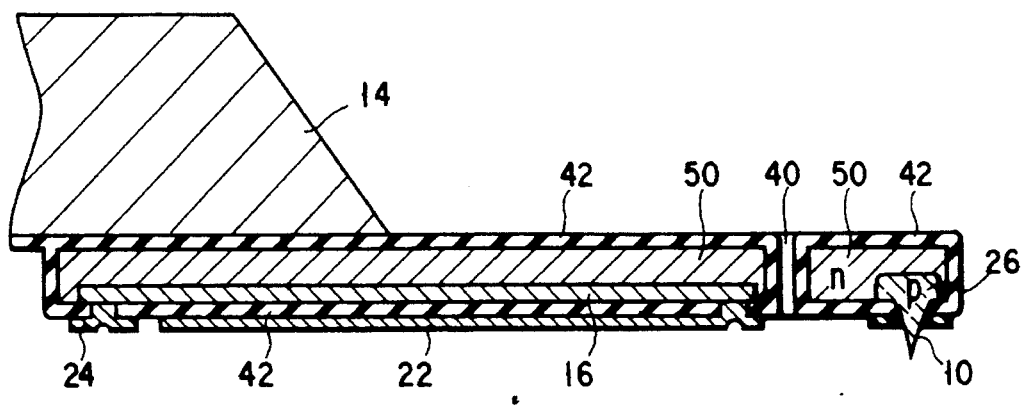
F I G. 2

F I G. 3
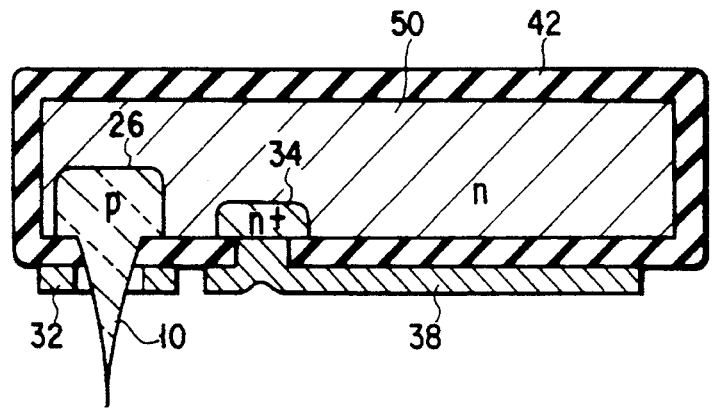
F I G. 4
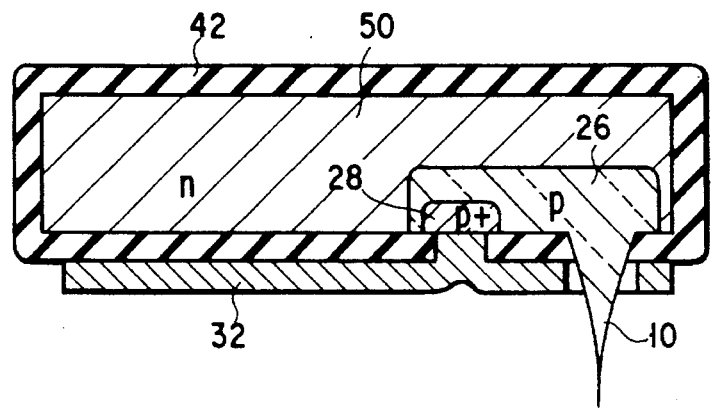
F I G. 5
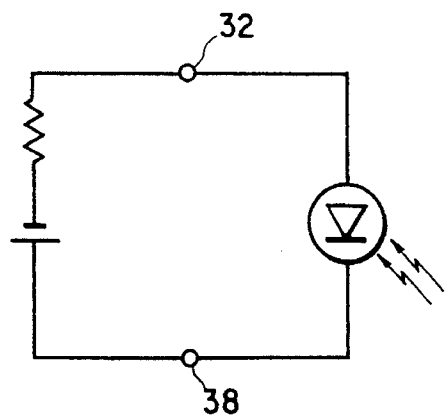
F I G. 6
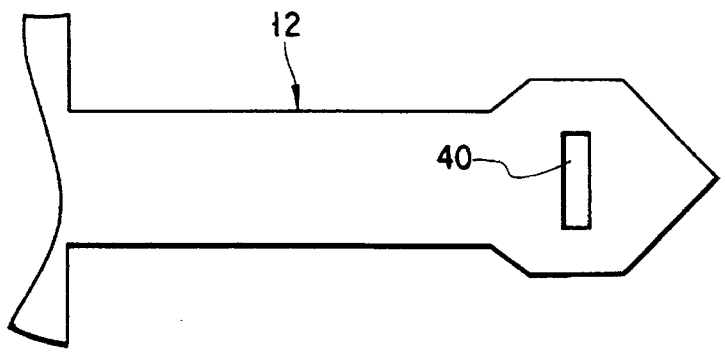

INTEGRATED SENSOR FOR SCANNING PROBE MICROSCOPE

BACKGROUND OF THE INVENTION

1. Field of the Invention

The present invention relates to an integrated sensor for a scanning probe microscope (SPM).

2. Description of the Related Art

From the latter half of 1980 onwards, proposals have been made to provide, as one of scanning probe microscopes, the optical microscope which is called a scanning near-field optical microscope (SNOM). The SNOM achieves a high resolution above the diffraction limitation, using an evanescent wave, which exists only in a region smaller in size than the optical wavelength and does not propagate in a free space.

The SNOM obtains an image of a sample by holding a probe with a very small aperture at its tip over a surface of the sample at a distance less than the optical wavelength and by mapping an intensity of light passing through the aperture.

Several types of the SNOM have been proposed and are broadly classified into a collection type and an emission type. In the collection-type SNOM, a SNOM image is obtained by detecting an evanescent wave, by means of the probe, which emerges on the sample surface illuminated with light coming from below. In the emission-type SNOM, on the other hand, a SNOM image is obtained by introducing light into the probe to emerge as an evanescent wave at the tip of the probe, by contacting the evanescent wave with a sample to convert it to propagating light, and by detecting the propagating light with a light detector positioned beneath the sample. An emission-type SNOM is disclosed, for example, in JPN PAT APPLN KOKAI PUBLICATION 4-291310.

Recently, N. F. van Hulst, et al. have proposed a method for effecting simultaneous measurement on the SNOM and AFM (atomic force microscope) using a cantilever in place of an optical fiber probe. This type of SNOM is disclosed, for example, N. F. van Hulst, M. H. P. Moers, O. F. J. Noordam, R. G. Tack, F. B. Segerink and B. Bolger, "Near-field optical microscope using a silicon-nitride probe", Appl. Phys. Lett. 62, 461–463, (1993).

As for the AFM, a sharp projection or probe, which is formed at a free end of a cantilever, is positioned close to a sample surface and is scanned across the sample surface. During the scan, a displacement of the cantilever (strictly speaking, of the probe), which is caused by an interaction force between atoms of the probe tip and the sample surface, is electrically or optically measured. Height information at each point on the sample surface is obtained on the basis of the displacement, and a three-dimensional image representing a configuration of the sample surface is formed by processing the height information synchronizing with positional data of the probe.

In the AFM, a sensor for measuring the displacement of the cantilever is generally provided separately from the cantilever. In recent years, an integrated sensor for an AFM, in which a cantilever has the function of measuring the displacement of itself, has been proposed. The integrated AFM sensor is disclosed, for example, in M. Tortonese, H. Yamada, R. C. Barrett and C. F. Quate, "Atomic force microscopy using a piezoresistive cantilever", Transducers and Sensor '91 and in PCT application WO92/12398.

The integrated AFM sensor uses a piezoresistive effect in its measurement principle. The integrated sensor has a cantilever in which a resistive layer is provided, and a constant voltage is applied to the resistive layer. When the probe tip (the tip end of the cantilever) is held over a sample, the cantilever is distorted due to an interaction between the probe and the sample. The resistance of the resistive layer varies in accordance with the magnitude of the distortion, such that an electric current flowing in the resistive layer changes. That is, the electric current flowing in the resistive layer varies in accordance with an amount of distortion or displacement of the cantilever. Consequently, the amount of the displacement of the cantilever is measured by detecting the changes of the electric current flowing in the resistive layer.

Being simple and compact in arrangement, the integrated AFM sensor is expected to be used as a so-called stand-alone type AFM, which scans a cantilever side. In the conventional AFM, since the position of the probe with respect to the sample is varied by moving the sample in X and Y directions, the size of the sample is restricted at maximum to the nearest few centimeters. The stand-alone type AFM has no such restriction and is able to measure a large sample.

Here, an explanation will be given below about the integrated AFM sensor and the drawings. In the beginning its manufacturing method will be described, referring to FIGS. 12A to 12D. As shown in FIG. 12A, a starting wafer 100, e.g., a bonded wafer, in which a silicon layer 114 is formed over a silicon wafer 110 with an isolation layer 112 of a silicon oxide provided therebetween, is prepared. Boron (B) ions are implanted in the silicon layer 114 at the surface, and, after being patterned to a configuration as shown in FIG. 12D, a resultant structure is covered with a silicon oxide layer 118. Holes for bonding are provided on the fixed end side of a cantilever and aluminum (Al) is sputtered there to provide electrodes 120. Further, a resist layer 122 is formed on a lower surface side of the silicon wafer 112 and patterned to provide an opening as shown in FIG. 12B. After a heating treatment step for providing ohmic contacts, the silicon wafer is etched by a wet type anisotropic etching with the resist layer 122 as a mask till the isolation layer 112 appears. Finally, the isolation layer 112 is etched with a hydrofluoric acid to provide a cantilever 124, so that an integrated sensor for an AFM is completed. A side cross sectional view and a top view of the sensor is shown in FIG. 12C and FIG. 12D, respectively.

FIG. 13 shows a circuit arrangement for effecting displacement measurement using the integrated AFM sensor. As shown in FIG. 13, a constant voltage supply 126 and an operational amplifier 128 for current measurement are connected to corresponding terminals 120 of the piezoresistive cantilever 124. With the potential of the constant voltage supply 126 set at a +5 volt, a potential on the terminal 120 of the piezoresistive cantilever on the upper side in FIG. 13 stays at a +5 volt. The other terminal 120 of the piezoresistive cantilever 124 is maintained at a GND potential since the non-inverting input terminal of the operational amplifier is set at a GND potential.

When the free end of the cantilever 124 is approached so close to the sample to cause an interaction between the atoms on the tip of the cantilever 124 and the surface of the sample, the cantilever 124 is displaced and hence the resistance of the piezoresistive layer 116 varies accordingly. As a result, the displacement of the cantilever 124 is detected as a current signal flowing between the two electrodes 120.

Recently, an integrated sensor for an SPM, which also detects an amount of torsion (LFM signal) of the cantilever 124, has also been proposed. The integrated sensor like this is disclosed, for example, in U.S. Pat. No. 5,386,720.

Also, a strain sensor using a piezoresistive layer can be manufactured by a silicon planer technique. The strain sensor is simple in arrangement and small in size, and is, therefore, suited to be an integrated part of the cantilever. Since the strain sensor is composed of an electric current element, an electric current flows through the sensor during AFM measurement to detect displacement of the cantilever. As a result, heat is generated from the piezoresistive layer and thermal noise mixes into a displacement signal, i.e., into an electric current signal from the piezoresistive layer. Thus, the S/N of the detected signal is degenerated, so that the resolution and reliability upon AFM measurement is declined.

Although the integrated AFM sensor as proposed by M. Tortonese, et al. has a strain sensor as an integrated part of a cantilever, a composite structure, in which another sensor such as a light sensor, a temperature sensor, a magnetic sensor, etc., may be an integrated part of the cantilever in addition to a the strain sensor, may be considered. If, however, plurality of sensors are simply combined into the composite structure, there is a fear that output signals of the sensors would be mixed with each other or mutually affected so as to reduce the detection sensitivity of the signals.

In the case where the light sensor disclosed in U.S. Pat. No. 5,294,790 is representative of a light sensor for SNOM measurement provided on the integrated AFM sensor in actual practice, the strain sensor evolves heat due to a continuous flow of an electric current during measurement, so as to cause a raise in temperature of the light sensor, and to give influence to a dark current of the light sensor. In the situation that a photodiode is used for the light sensor, an ambient temperature raise by 5° to 10° C. causes a double dark current flow. An increase in dark current leads to a decline in S/N and in sensitivity of the light sensor. As a result, a minimal amount of light resolvable by the light sensor rises, and sensitivity of SNOM measurement decreases accordingly.

In the case where the strain sensor and light sensor are mounted onto one cantilever, a problem occurs due to an electric contact resulting from the voltages applied to the respective sensors. In a practical case, dark currents originating from voltages on a strain sensor and light sensor are mixed as noise into signals of the light sensor and strain sensor or a variation in a reference potential on the light sensor will arise. It is, therefore, not possible to achieve AFM measurement, as well as SNOM measurement, with improved sensitivity.

SUMMARY OF THE INVENTION

It is accordingly an object of the present invention to provide an integrated sensor for an SPM in which a temperature of a sensor at a free end of a cantilever hardly rises even when an evolution of heat from a strain sensor becomes an integrated part of the cantilever.

Additional objects and advantages of the invention will be set forth in the description which follows, and in part will be obvious from the description, or may be learned by practice of the invention. The objects and advantages of the invention may be realized and obtained particularly in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a plan view showing an integrated sensor for an SPM, as viewed from a probe side, in accordance with a first embodiment of the present invention;

FIG. 2 is a cross-sectional view, as taken along line II—II in FIG. 1, showing the integrated SPM sensor of the first embodiment;

FIG. 3 is a cross-sectional view, as taken along line III—III in FIG. 1, showing the integrated SPM sensor of the first embodiment;

FIG. 4 is a cross-sectional view, as taken along IV—IV in FIG. 1, showing the integrated SPM sensor of the first embodiment;

FIG. 5 is an equivalent circuit of a portion around the probe in the first embodiment of the present invention;

FIG. 6 is a modification of a cantilever configuration of the first embodiment;

DETAILED DESCRIPTION OF THE PREFERRED EMBODIMENTS

Figure 7A:
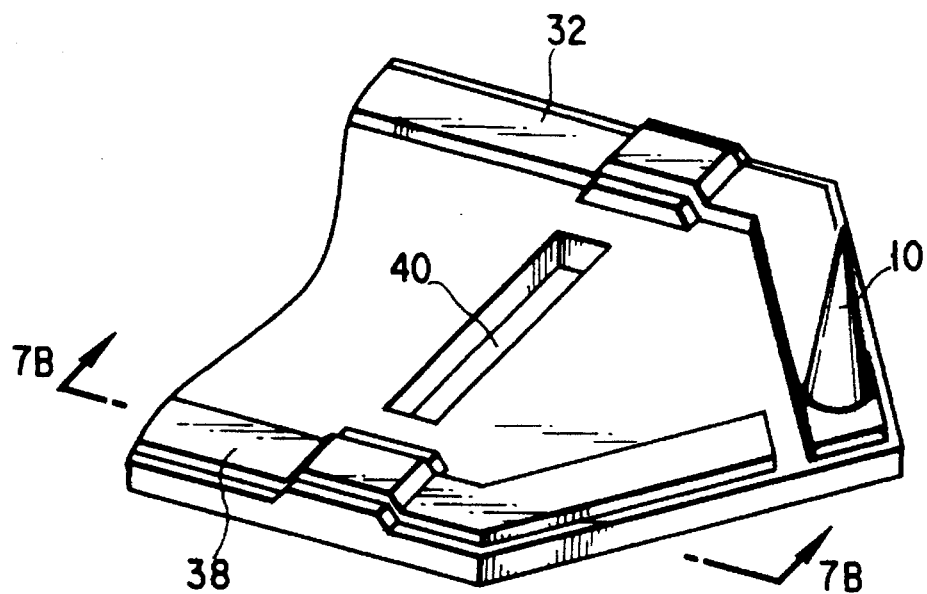
FIG. 7A is a view showing another modification of a cantilever configuration of the first embodiment.

The embodiments of the present invention will be explained below with reference to the accompanying drawings.

First Embodiment

As shown in FIGS. 1 to 4, an integrated sensor for an SPM has a cantilever 12 extending from a support section 14, and a piezoresistive layer 16 is provided in the cantilever 12 at its middle area and extended in a longitudinal direction. The piezoresistive layer 16 has such a property that the resistance varies in accordance with a strain and provides a strain sensor for the cantilever 12. A base 50 of the cantilever 12 is constituted of an n type silicon and the piezoresistive layer 16 is formed of a p type silicon. The base 50 and piezoresistive layer 16 of the cantilever 12 are covered with a silicon oxide film 42. An electrode 20 is provided on the silicon oxide film 42 and extends longitudinally at the middle section of the cantilever 12 so as to cover the piezoresistive layer 16. The electrode 20 is connected to the piezoresistive layer 16 at a free end via a contact hole 18. An electrode 24 is connected via a contact hole 22 to the piezoresistive layer 16 at a support-section-side end.

A p type silicon region 26 is partly formed at the free end area of the cantilever 12 to provide a sharply pointed projection or probe 10. A $p^+$ type silicon region 28 is formed in the p type silicon region 26. The $p^+$ type silicon region 28 is connected via a contact hole 30 to an electrode 32, such as aluminum, provided on the silicon oxide film 42. The electrode 32 extends along the edge of the cantilever 12 so that its forward end portion covers most of the p type silicon region 26 except for the probe 10. The electrode 32 has a circular opening at its forward end, and the probe 10 is projected externally through the circular opening in the electrode 32.

An $n^+$ type silicon region 34 is provided in a position more than 10 μm away from the p type silicon region 26. The $n^+$ type silicon region 34 is connected via a contact hole 36 to the electrode 38, such as aluminum, provided on the silicon oxide film 42. The electrode 38 extends along the edge of the cantilever 12 so that its forward end portion covers the $n^+$ type silicon region 34.

The $p^+$ type silicon region 28 is formed between the p type silicon region 26 and the electrode 32 so as to provide an ohmic contact between them, while, on the other hand, the $n^+$ type silicon region 34 is formed between the n type silicon layer 50 and the electrode 38 so as to provide an ohmic contact between them. A pn junction between the n type silicon layer 50 and the p type silicon region 26 constitutes a pn photodiode. The pn photodiode serves as a light sensor which generates a signal corresponding to the intensity of incident light.

An elongated hole 40 extending through the cantilever 12 is provided between the photodiode serving as the light sensor and the piezoresistive layer 16 serving as the strain sensor.

Upon measurement on the integrated sensor, a predetermined potential difference is applied between the electrode 20 and the electrode 24. The potential difference is preferably applied so that a potential on the probe-side end of the piezoresistive layer 16 is set at a zero volt. For example, the electrode 20 is connected to a inverting terminal of an operational amplifier (not shown), a non-inverting terminal of the operational amplifier is grounded, and a positive voltage of a few volts is applied to the electrode 20. When the cantilever 12 is bent or displaced in a z-direction, i.e., a direction vertical to a paper plane in FIG. 1, the resistance of the piezoresistive layer 16 varies in accordance with the amount of bending or displacement, and hence a current flowing from them varies. The amount of displacement of the cantilever 12 is found by examining a variation in the current between the electrodes 20 and 24.

As indicated by an equivalent circuit in FIG. 5, a reverse bias voltage of 3 to 4 volts is applied across the electrodes 32 and 38. The p type silicon region 26 and n type silicon region 50 between the electrodes 32 and 38 constitute a pn photodiode, which outputs a signal corresponding to the intensity of light incident on the probe 10 of the p type silicon region 26. Thus, the intensity of light incident on the probe 10 is found by examining the signal.

A modification in which the probe 10 is of n type silicon and its surrounding area is of p type silicon may be made. In this case, an electrode connected to the probe 10 corresponds to the electrode 38 in FIG. 5, and an electrode connected to the surrounding area corresponds to the electrode 32 in FIG. 5.

During AFM measurement, since an electric current continuously flows through the piezoresistive layer 16, heat is generated. The heat travels abroad on the surface of the cantilever. The hole 40, which is formed between the piezoresistive layer 16 and the pn photodiode, prevents heat traveling toward the free end of the cantilever 12. Thus, an increase in temperature of the pn photodiode is suppressed due to the heat from the piezoresistive layer 16. For this reason, the dark current variation of the pn photodiode due to the thermal drift is suppressed.

A leakage in currents resulting from a voltage applied to the piezoresistive layer 16 and a leakage in currents from a voltage applied to the pn photodiode hardly affect each other by the presence of the slit 40.

According to the integrated SPM sensor, it is possible, upon simultaneous AFM/SNOM measurement, to perform SNOM measurement with high resolution due to the slight thermal drift on the AFM measurement.

Figure 7B:
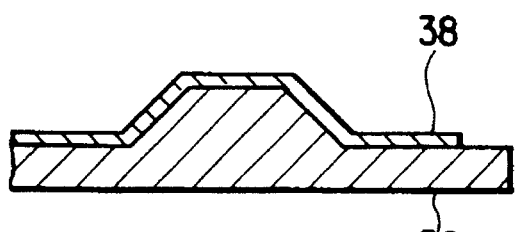
FIG. 7B is a cross-sectional view, taken along line 7B—7B in FIG. 7A.
Figure 7C:
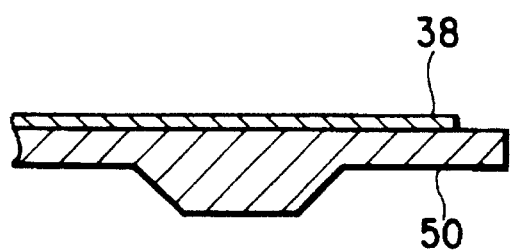
FIG. 7C is a cross-sectional view showing another modification of a cantilever configuration in FIG. 7A.

In the above-mentioned embodiment, the elongated hole 40 extends near each side edge of the cantilever 12 in such a way that the strength of the cantilever 12 would fall at local areas. As a modification for preventing a partial decrease in the strength of the cantilever 12, a bulge area may be provided relative to each end of a hole 40 in the cantilever as shown in FIG. 6. As additional modifications, a cantilever may be constructed so that an upwardly thick wall area is provided at each end side of a slit 40 as shown in FIGS. 7A and 7B, and a downwardly thick wall area may be provided at each end side of a slit 40, in the designing of the cantilever, as shown in FIG. 7C.

Although, in the preceding embodiment, an elongated hole is provided as the slit 40 in the cantilever, any other proper hole configuration may be taken so long as a separation area is provided between the piezoresistive layer and the photodiode. For example, a multi-hole area may be provided, in a mesh-like array, between the piezoresistive layer and the photodiode. In this case, as AFM measurement is made with an oscillated cantilever, an alternative advantage in that a fall in the sensitivity of measurement resulting from the damping effect of air is reduced, is additionally achieved.

Second Embodiment

Figure 8:
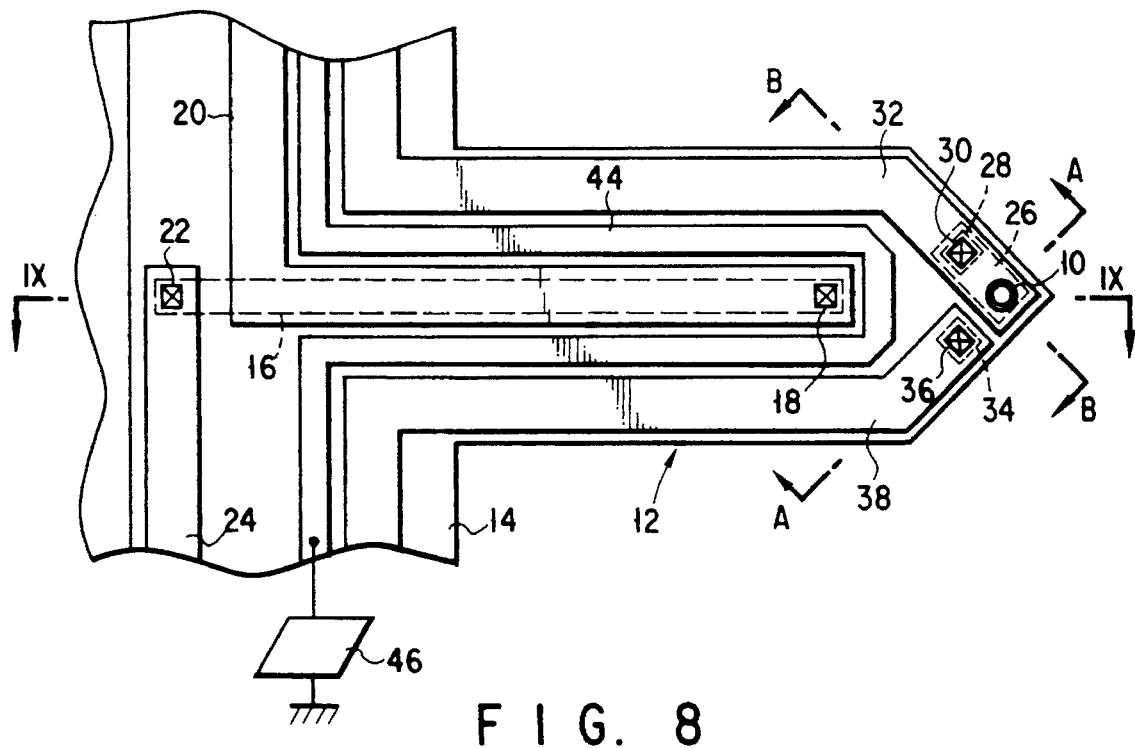
FIG. 8 is a plan view showing an integrated sensor for an SPM, as viewed from a probe side, in accordance with a second embodiment of the present invention.
Figure 9:
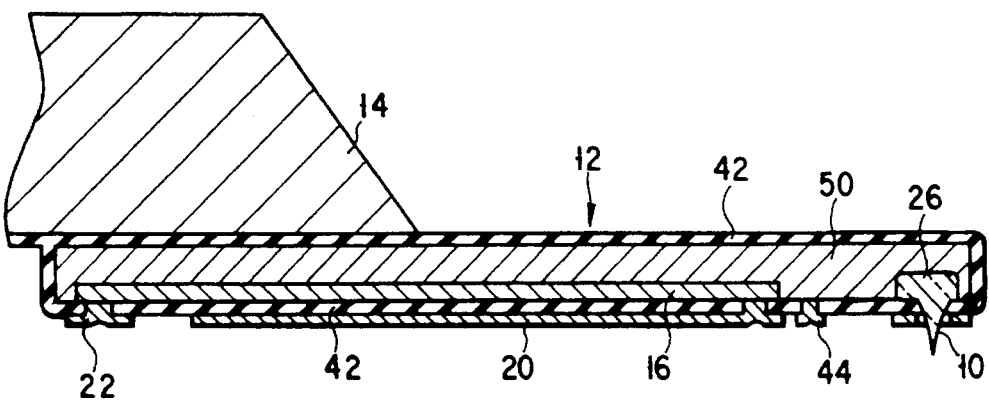
FIG. 9 is a cross-sectional view, taken along line IX—IX in FIG. 8, showing the integrated SPM sensor of the second embodiment.

An integrated sensor for an SPM in accordance with a second embodiment of the present invention will be explained below with reference to FIGS. 8 and 9. In FIGS. 8 and 9, the parts or elements that are the same as the first embodiment are designated by the same reference numerals. The cross-sectional structures that are taken along lines A—A and B—B in FIG. 8 are just the same as that of the first embodiment of the present invention, and are shown in FIGS. 3 and 4, respectively.

The integrated SPM sensor of the second embodiment is of such a type that, in place of providing the slit 40 of the first embodiment, an aluminum connection layer or strip 44 is provided which extends from a support section 14 toward a free end of a cantilever 12 in a way to surround a piezoresistive layer 16. The aluminum connection layer 44 is connected to a heat sink plate 46, made of aluminum, and grounded via the heat sink plate 46.

Heat generated in the piezoresistive layer 16 is dissipated from the heat sink plate 46 via the aluminum connection layer 44 of a good conductor. Since the aluminum connection layer 44 is grounded, eliminated are a dark current generated in the pn photodiode and a leakage current generated at the surface of the cantilever due to a voltage across the electrodes 20, 24, 32 and 38.

According to the integrated SPM sensor in accordance with the present embodiment, SNOM measuring performed without the pn photodiode is influenced by a thermal drift on AFM measurement.

Further, an improvement in the efficiency of the heat sink plate or a positive cooling of the heat sink plate would suppress the rise in temperature as well as thermal drift, and therefore a high sensitive AFM measurement will be achieved.

In addition, since the dark current and the leakage current are eliminated, the SNOM signal and AFM signal involve less noise, and the SNOM measurement and AFM measurement are improved.

Although, in the embodiments mentioned above, the cantilever is substantially I-shaped in configuration, it may be made U- or E-shaped in configuration.

Although, in the embodiments above, the base is formed of the n type silicon, it may be formed of a p type silicon. In this case, the p type silicon region and $p^+$ type silicon region are replaced with an n type silicon region and an $n^+$ type silicon region, respectively.

Although, in the embodiments above, a reverse bias voltage is applied to the pn photodiode, no particular voltage may be applied so long as incident light is detected.

Figure 10:
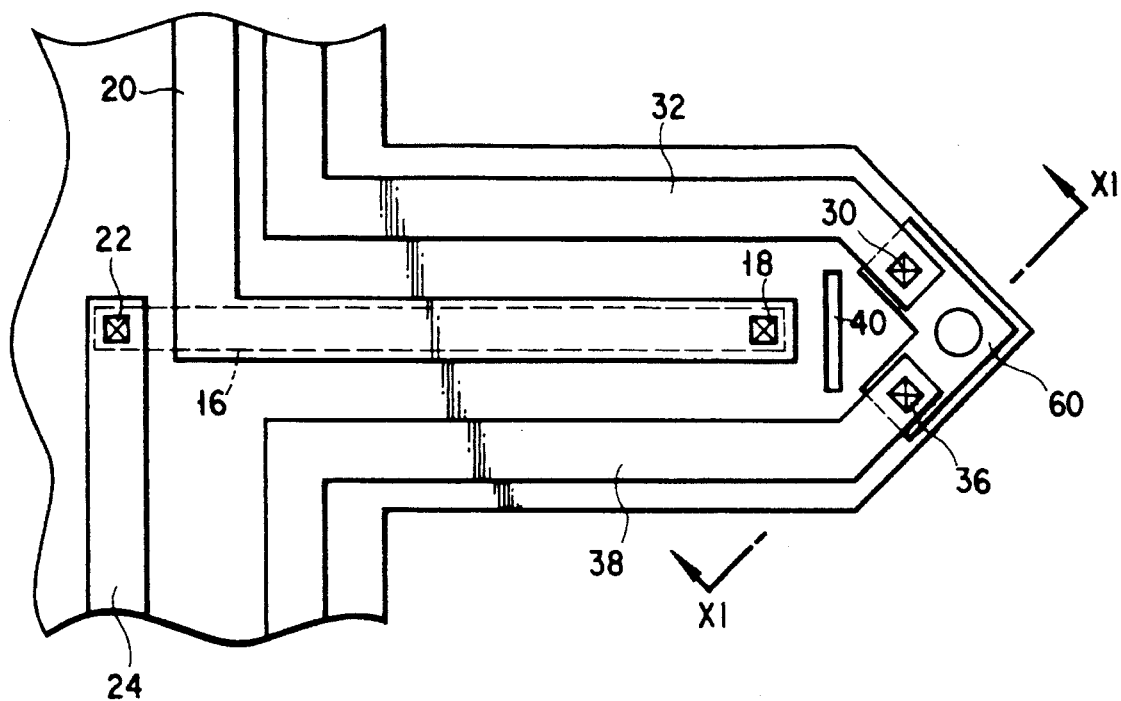
FIG. 10 is a plan view showing an integrated sensor for an SPM, as viewed from a probe side, in accordance with another embodiment of the present invention, which has a temperature sensor.
Figure 11:
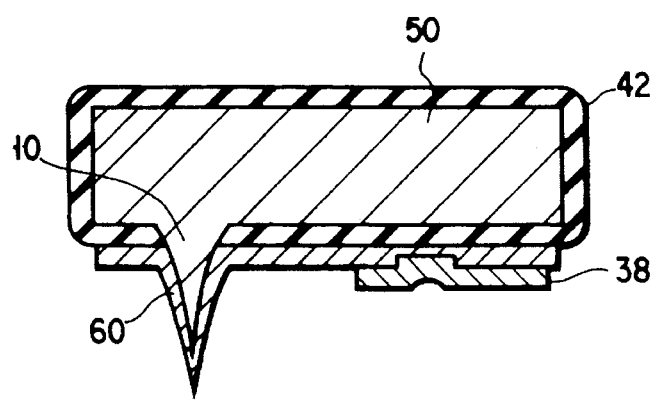
FIG. 11 is a cross-sectional view, taken along line XI—XI in FIG. 10, showing the integrated SPM sensor of the other embodiment.
Figure 12A:
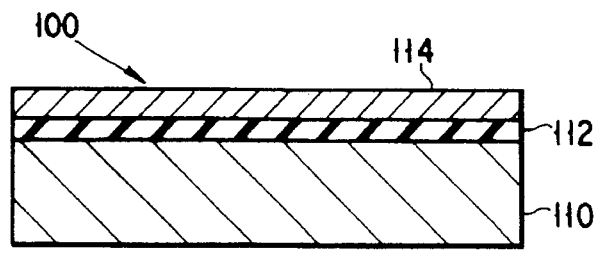
FIGS. 12A to 12D show steps of a manufacture of a conventional integrated sensor for an AFM.
Figure 12B:
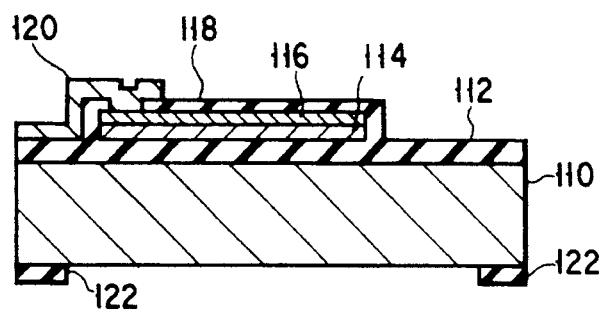
Figure 12C:
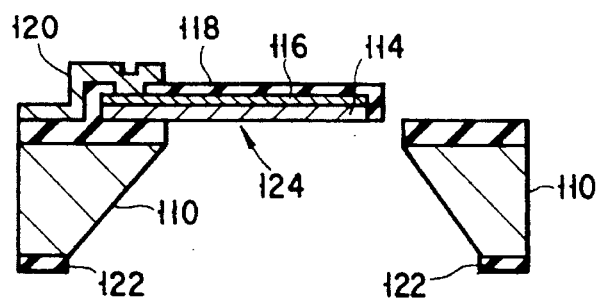
Figure 12D:
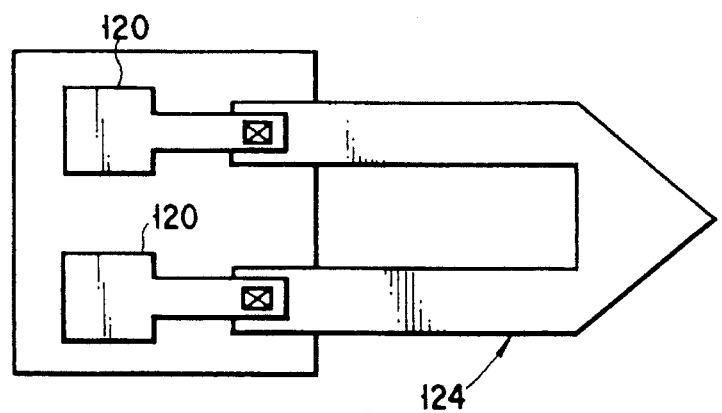
Figure 13:
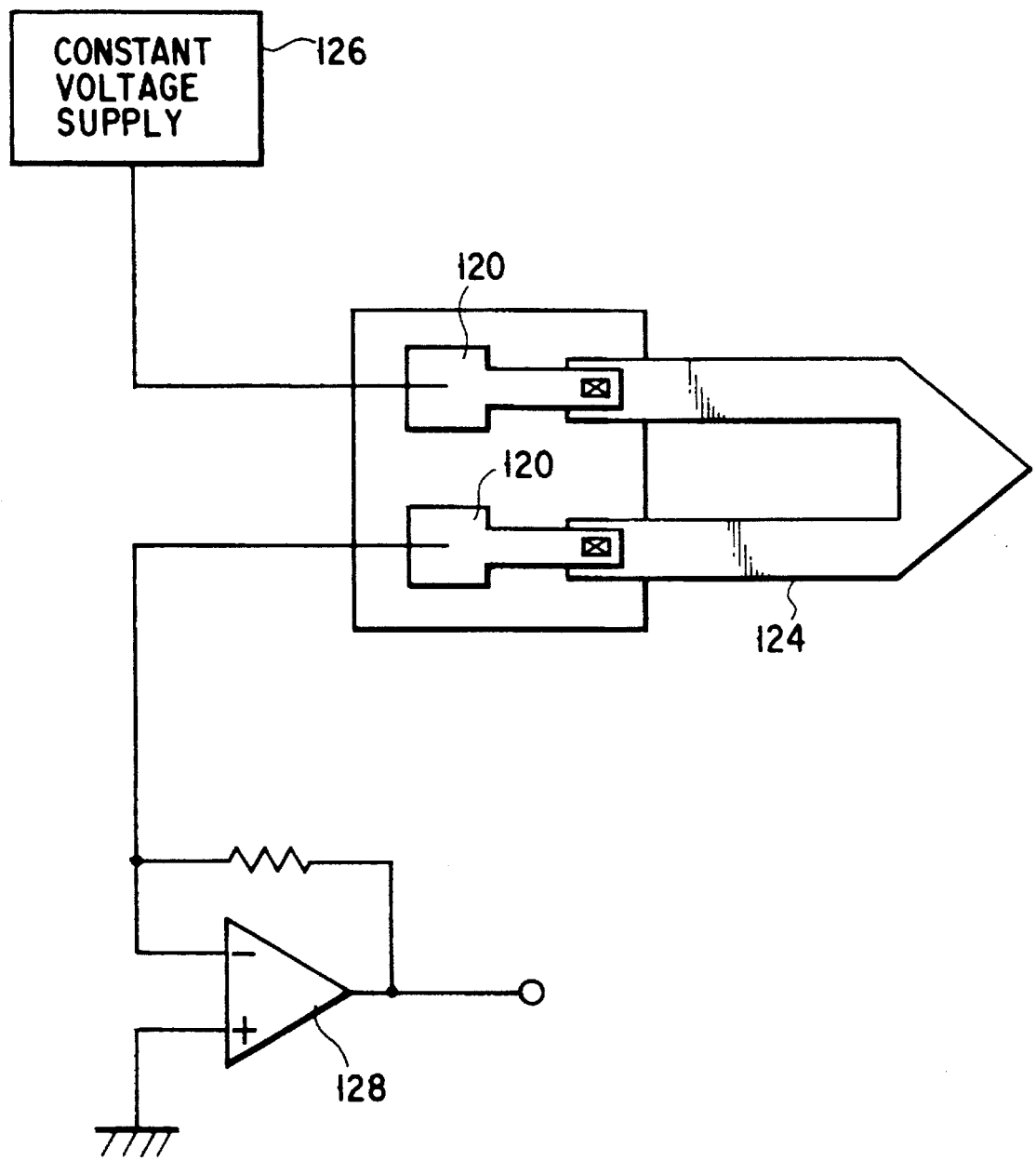
FIG. 13 shows a displacement measuring circuit in the conventional integrated AFM sensor shown in FIG. 12D.

Although the light sensor has been explained as a sensor provided at the free end portion of the cantilever, another sensor, such as a magnetic sensor and temperature sensor, may be provided instead. Here, as one example, an integrated SPM sensor that has a temperature sensor at the free end of the cantilever will be explained below with reference to FIGS. 10 and 11. The sensor has a platinum film 60 that covers the probe 10. The platinum film 60 is a resistor for measuring temperature, and its ends are connected to the electrodes 32 and 38. The base 50 inside the silicon oxide film 42 is formed of n type silicon. The base 50 may be formed of p type silicon. The resistance of the platinum film 60 varies in response to a temperature change at the tip of the probe 10. The temperature is measured by detecting the resistance of the platinum film 60, i.e., by measuring an electric current flowing between the electrodes 32 and 38. Instead of the platinum film 60 as the temperature-measuring resistor, a conductive film of copper or nickel or the other metals may be provided. As another example, an integrated SPM sensor that has a magnetic sensor may be anticipated. In this case, the integrated sensor has a magnetic resistivity film, which is provided instead of the platinum film 60 in FIGS. 10 and 11, and detects a magnetic change at the tip of the probe 10 as a resistance change of the magnetic film. As the magnetic sensor manufacturable with the use of a silicon planar technique, a vertical npn magnetic transistor can be listed by way of example. Similarly, as the temperature sensor manufacturable with the use of the silicon planar technique, a spreading resistance type temperature sensor and bipolar transistor can be listed by way of example. The bipolar transistor can be used as a temperature sensor with the use of its characteristics, that is, characterized so that a base-to-emitter junction potential varies proportional to a temperature involved.

Additional advantages and modifications will be obvious to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An integrated sensor for an SPM comprising:

a support section; and a flexible cantilever extending from the support section; the cantilever comprising:
   (a) a resistive layer extending in a longitudinal direction and having a resistance that varies in response to its strain;
   (b) a probe disposed at a free end for detecting a physical amount from a sample surface at a local area;
   (c) a sensor for detecting the physical amount picked up by the probe; and
   (d) means for preventing heat generated by the resistive layer from traveling toward the sensor.

2. An integrated sensor according to claim 1, wherein the preventing means comprises a through hole formed in the cantilever between the resistive layer and the sensor.

3. An integrated sensor according to claim 2, wherein the through hole is elongated in a width direction of the cantilever.

4. An integrated sensor according to claim 3, wherein the cantilever has bulged areas provided at both end sides of the elongated hole.

5. An integrated sensor according to claim 3, wherein the cantilever has thick-walled areas provided at both end sides of the elongated hole.

6. An integrated sensor according to claim 1, wherein the preventing means comprises a plurality of though holes to provide a mesh-like area formed in the cantilever between the resistive layer and the sensor.

7. An integrated sensor according to claim 1, further comprising a strip extending between the resistor layer and the sensor and having a good heat conductivity and good electrical conductivity.

8. An integrated sensor according to claim 7, wherein the strip includes portions extending in parallel to both longitudinal sides of the resistive layer.

9. An integrated sensor according to claim 7, further comprising a heat sink plate thermally connected to the strip.

10. An integrated sensor according to claim 7, wherein the strip is grounded.

11. An integrated sensor according to claim 1, wherein the sensor is comprised of a light sensor.

12. An integrated sensor according to claim 11, wherein the light sensor comprises: (i) an n type silicon connected to a first electrode; and (ii) a p type silicon connected to a second electrode, the p type silicon being in contact with the n type silicon; and the probe is electrically connected to the p type silicon.

13. An integrated sensor according to claim 12, wherein the first electrode is connected to the n type silicon through an $n^+$ type silicon, and the second electrode is connected to the p type silicon through a $p^+$ type silicon.

14. An integrated sensor according to claim 11, wherein the light sensor comprises: (i) a p type silicon connected to a first electrode; and (ii) an n type silicon connected to a second electrode, the n type silicon being in contact with the p type silicon; and the probe is electrically connected to the n type silicon.

15. An integrated sensor according to claim 14, wherein the first electrode is connected to the p type silicon through a $p^+$ type silicon.

16. An integrated sensor according to claim 1, wherein the sensor is comprised of a temperature sensor.

17. An integrated sensor according to claim 16, wherein the temperature sensor comprises a platinum film covering the probe, and two electrodes connected to the platinum film for measuring the resistance of the platinum film.

18. An integrated sensor according to claim 17, wherein the magnetic sensor comprises a magnetic resistivity film covering the probe, and two electrodes connected to the magnetic resistivity film for measuring the resistance of the magnetic resistivity film.

19. An integrated sensor according to claim 1, wherein the sensor is comprised of a magnetic sensor.

* * * * *